United States Patent
Kurata

(10) Patent No.: US 8,863,588 B2
(45) Date of Patent: Oct. 21, 2014

(54) FLOW SENSOR

(71) Applicant: SMC Kabushiki Kaisha, Chiyoda-ku (JP)

(72) Inventor: Toshinori Kurata, Tsukubamirai (JP)

(73) Assignee: SMC Kabushiki Kaisha, Chiyoda-ku (JP)

( * ) Notice: Subject to any disclaimer, the term of this patent is extended or adjusted under 35 U.S.C. 154(b) by 139 days.

(21) Appl. No.: 13/720,145

(22) Filed: Dec. 19, 2012

(65) Prior Publication Data

US 2013/0192387 A1 Aug. 1, 2013

(30) Foreign Application Priority Data

Jan. 26, 2012 (JP) .................. 2012-013715

(51) Int. Cl.
*G01F 1/32* (2006.01)
*G01F 1/66* (2006.01)

(52) U.S. Cl.
CPC ..................... *G01F 1/662* (2013.01)
USPC ...................................... 73/861.24

(58) Field of Classification Search
USPC ............... 73/861.24, 861.02, 195, 861.22
See application file for complete search history.

(56) References Cited

U.S. PATENT DOCUMENTS

| | | | | |
|---|---|---|---|---|
| 3,823,610 A | * | 7/1974 | Fussell, Jr. | 73/861.24 |
| 4,984,470 A | * | 1/1991 | Hayward et al. | 73/861.22 |
| 5,503,021 A | * | 4/1996 | Lew | 73/661 |
| 5,808,209 A | * | 9/1998 | Zielinska et al. | 73/861.22 |
| 5,814,735 A | | 9/1998 | Kurisaki et al. | |
| 8,683,874 B2 | * | 4/2014 | Limacher et al. | 73/861.24 |

FOREIGN PATENT DOCUMENTS

| | | |
|---|---|---|
| JP | 9-89613 | 4/1997 |
| JP | 11-6748 | 1/1999 |
| JP | 2004-191173 A | 7/2004 |
| JP | 2005-114657 A | 4/2005 |
| JP | 2008-107171 A | 5/2008 |

OTHER PUBLICATIONS

Notice of Allowance issued Dec. 3, 2013 in Japanese Patent Application No. 2012-013715 with partial English translation.

* cited by examiner

*Primary Examiner* — Jewel V Thompson
(74) *Attorney, Agent, or Firm* — Oblon, Spivak, McClelland, Maier & Neustadt, L.L.P.

(57) ABSTRACT

In a flow sensor, a horizontal dimension Xt between short side wall portions facing respective sides of a vortex generator is longer than a vertical dimension Yt between long side wall portions facing respective ends of the vortex generator. The short side wall portions are formed linearly or in straight lines along the vortex generator, whereas the long side wall portions are curved at a predetermined radius of curvature.

4 Claims, 22 Drawing Sheets

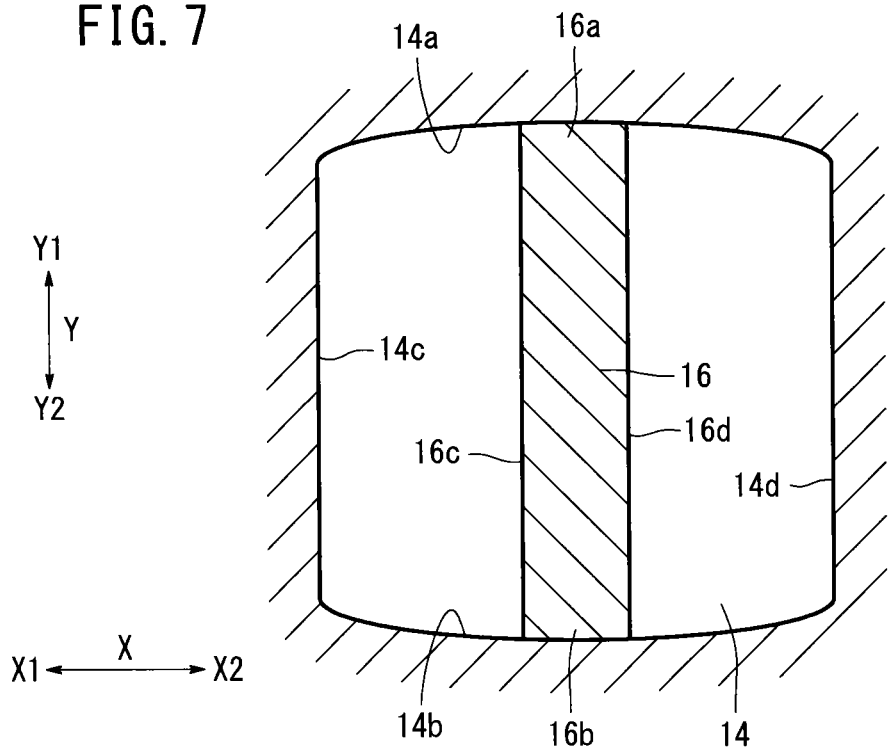

FIG. 9

| ITEM | | CONDITIONS | | | |
|---|---|---|---|---|---|
| | | COMPARATIVE EXAMPLE 1 | COMPARATIVE EXAMPLE 2 | COMPARATIVE EXAMPLE 3 | INVENTIVE EXAMPLE 1 |
| FLOW PASSAGE | TOTAL LENGTH (Z) [mm] | 30.00 | 30.00 | 30.00 | 30.00 |
| | VERTICAL (Y) [mm] | 4.75 | 3.30 | 3.40 | 3.30 |
| | HORIZONTAL (X) [mm] | 4.75 | 4.50 | 5.80 | 4.50 |
| | RADIUS OF CURVATURE (R) [mm] | — | — | — | 20 |
| | MEASURED FLOW VELOCITY (4 [l/min]) [m/s] | 6.4 – 7.1 | | | |

FIG. 10

| ITEM | TEST RESULTS | | | |
|---|---|---|---|---|
| | COMPARATIVE EXAMPLE 1 | COMPARATIVE EXAMPLE 2 | COMPARATIVE EXAMPLE 3 | INVENTIVE EXAMPLE 1 |
| MINIMUM MEASURED FLOW RATE [l/min] | 0.40 | 0.40 | 0.40 | 0.24 |
| MEASUREMENT FREQUENCY (0 - 4.0 [l/min]) [Hz] | 705.0 | 715.0 | 750.0 | 762.0 |

FIG. 13

| ITEM | | CONDITIONS | |
|---|---|---|---|
| | | COMPARATIVE EXAMPLE 4 | INVENTIVE EXAMPLE 2 |
| FLOW PASSAGE | TOTAL LENGTH (Z) [mm] | 30.00 | 30.00 |
| | VERTICAL (Y) [mm] | 2.50 | 3.30 |
| | HORIZONTAL (X) [mm] | 4.90 | 4.50 |
| | RADIUS OF CURVATURE (R) [mm] | — | 20 |
| | CROSS SECTIONAL AREA (S) [mm$^2$] | 7.20 | 9.20 |

FIG. 14

| ITEM | | | | CONDITIONS | |
|---|---|---|---|---|---|
| | | | | COMPARATIVE EXAMPLE 4 | INVENTIVE EXAMPLE 2 |
| FREQUENCY CHARACTERISTICS [Hz] | | -MAX | [%]F.S. | 715 | 762 |
| | | +MAX | [%]F.S. | -1.2% | -0.5% |
| LINEARITY | 0.4 – 4.0[l/min] | -MAX | [%]F.S. | 3.9% | 2.5% |
| | 4.0 – 6.0[l/min] | +MAX | [%]F.S. | 0.0% | -2.5% |
| | | | | 48.6% | 0.0% |

FIG. 17

| ITEM | | DESIGN VALUES | | | | | |
|---|---|---|---|---|---|---|---|
| | | CONDITION 1 | CONDITION 2 | CONDITION 3 | CONDITION 4 | CONDITION 5 | CONDITION 6 |
| FLOW PASSAGE | TOTAL LENGTH (Z) [mm] | 30.00 | 30.00 | 30.00 | 30.00 | 30.00 | 30.00 |
| | VERTICAL (Y) [mm] | 3.30 | 3.30 | 3.30 | 3.30 | 3.60 | 4.10 |
| | HORIZONTAL (X) [mm] | 4.50 | 4.50 | 4.50 | 4.50 | 4.50 | 4.50 |
| | RADIUS OF CURVATURE (R) [mm] | ∞ | 40 | 20 | 15 | 10 | 5 |

FIG. 18

| ITEM | TEST RESULTS | | | | | |
|---|---|---|---|---|---|---|
| | R=∞ | R=40 | R=20 | R=15 | R=10 | R=5 |
| MINIMUM MEASURED FLOW RATE [l/min] | 0.40 | 0.24 | 0.24 | 0.24 | 0.56 | 0.64 |
| MEASUREMENT FREQUENCY (0 – 4.0 [l/min]) [Hz] | 715.0 | 776.0 | 800.0 | 800.0 | 735.0 | 705.0 |

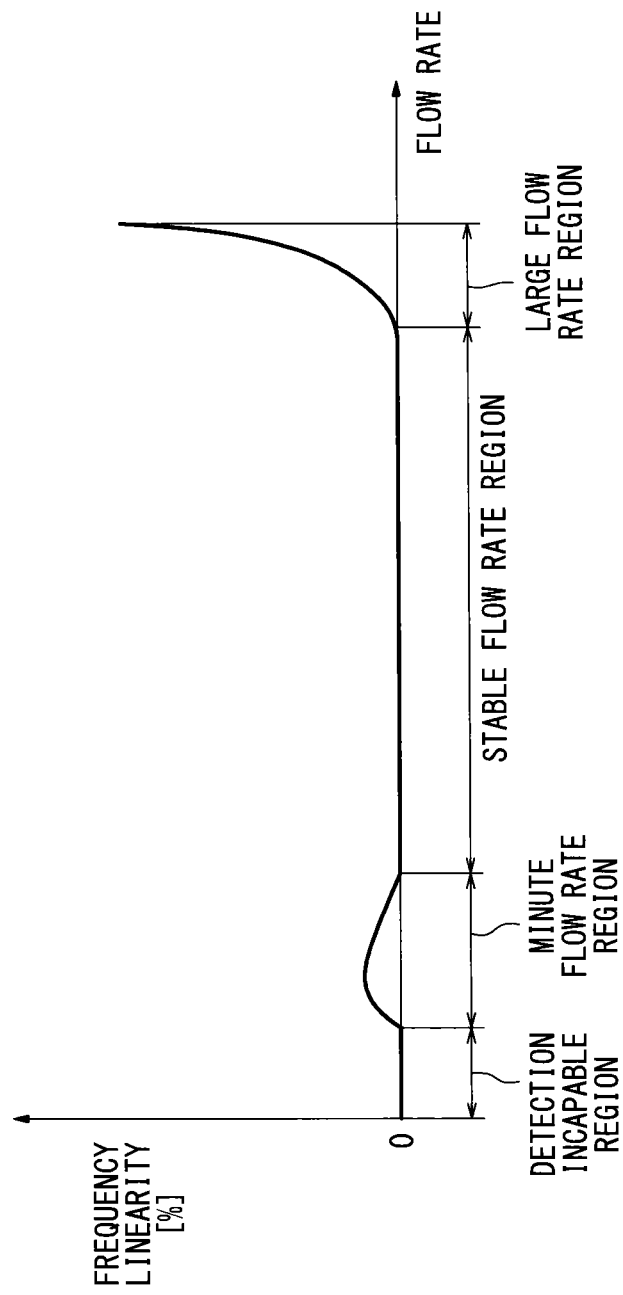

FLOW SENSOR

CROSS-REFERENCE TO RELATED APPLICATION

This application is based upon and claims the benefit of priority from Japanese Patent Application No. 2012-013715 filed on Jan. 26, 2012, the contents of which are incorporated herein by reference.

BACKGROUND OF THE INVENTION

1. Field of the Invention

The present invention relates to a flow sensor for detecting the flow rate of a fluid in a flow passage.

2. Description of the Related Art

Heretofore, in a Karman vortex type flow sensor, a vortex generator and a sensor element are disposed in series along a flow direction of a fluid in a flow passage, such that when a fluid flows through the interior of the flow passage and Karman vortexes are generated therein, the sensor element detects a flow rate of the fluid based on a frequency (generation period) at which Karman vortexes are generated.

In such a Karman vortex type flow sensor, in order to detect minute flow rates (e.g., flow rates close to zero), it is necessary for the cross sectional area of the flow passage to be designed at a small value for thereby enhancing the Reynolds number (Re) indicated by the following equation (1).

$$Re=(\text{Fluid Inertial Force})/(\text{Fluid Viscous Force}) \quad (1)$$

In equation (1), the "Fluid Inertial Force" is defined as a force that acts on the fluid separately from the surrounding fluid, whereas the "Fluid Viscous Force" is defined as a force that acts on the fluid in the same manner as the surrounding fluid.

A cross sectional configuration of a conventional flow passage will be described below with reference to FIGS. 21A through 21C.

FIG. 21A is a view showing a case in which a vortex generator 16 is disposed in a flow passage 14 that is circular in cross section. In this case, a columnar vortex generator 16, which is disposed at a central position in the widthwise direction (X direction) of the flow passage 14, is erected in an upstanding manner along the Y direction. Further, ends 16a, 16b of the vortex generator 16 are in contact with a wall portion 14e that forms a wall surface of the flow passage 14.

In this case, a distance in the X1 direction from the side 16c of the vortex generator 16 to the wall portion 14e, and a distance in the X2 direction from the side 16d of the vortex generator 16 to the wall portion 14e are equivalent to each other and are defined by Xe.

With the flow passage 14 having the circular cross sectional shape shown in FIG. 21A, if the diameter (flow passage diameter) of the flow passage 14 is designed to be small, the distance Xe becomes small. In particular, in the vicinity of the ends 16a, 16b of the vortex generator 16, since the ends 16a, 16b and the wall portion 14e are in close contact with each other, the distance Xe is remarkably small.

For this reason, with the cross sectional configuration of FIG. 21A, by making the cross sectional area of the flow passage 14 smaller, the fluid viscous force caused by wall surface resistance of the flow passage 14 rises to a significant extent, more so than the enhancement in the fluid inertial force. As a result, the Reynolds number Re cannot be enhanced and it is difficult to detect minute flow rates close to zero.

FIG. 21B illustrates a case in which the flow passage diameter is designed to be larger than the cross sectional configuration of FIG. 21A. In this case, since the distance Xe is widened, the viscous force in a low flow velocity (small flow rate) region is reduced. However, due to the increase in the cross sectional area of the flow passage 14, the fluid inertial force is lowered, and hence the Reynolds number Re cannot be enhanced. As a result, it is quite difficult to detect minute flow rates close to zero.

Thus, it has been contemplated to design the width W of the vortex generator 16 to be shorter along the X direction, thereby widening the distance Xe. However, if designed in this manner, an alternating force (i.e., a force of the vortex that is generated alternately on the downstream side of the vortex generator 16) and/or the strength (structural integrity) of the vortex generator 16 are lowered. As a result, detection sensitivity of the Karman vortex at the sensor element is decreased, so that detection of Karman vortexes becomes difficult, and durability of the vortex generator 16 is degraded.

FIG. 21C illustrates a cross sectional configuration as disclosed in Japanese Laid-Open Patent Publication No. 11-006748.

As shown in FIG. 21C, in order to solve the aforementioned problems, the flow passage 14 is set to have an elliptical shape in cross section. More specifically, the dimension (lateral direction) of the flow passage 14 in the widthwise direction (X direction) of the vortex generator 16 is set to be longer than the dimension (vertical dimension) Yg of the flow passage 14 in the axial direction (Y direction) of the vortex generator 16.

In this case, the flow passage 14 is defined by two wall portions 14g, 14h facing ends 16a, 16b of the vortex generator 16, and two wall portions 14i, 14j facing respective sides 16c, 16d of the vortex generator 16. Each of the wall portions 14g, 14h is formed linearly or in a straight shape along the X direction, whereas each of the wall portions 14i, 14j is formed in a semicircular shape, so as to facilitate smooth flow of the fluid in the flow passage 14.

In accordance with such a cross sectional configuration, in the structure of Japanese Laid-Open Patent Publication No. 11-006748, even if the cross sectional area of the flow passage 14 is designed to be small, the distance Xg between the sides 16c, 16d of the vortex generator 16 and the wall portions 14i, 14j can be made larger. As a result, together with enhancing the fluid inertial force, the fluid viscous force is reduced, thereby enabling minute flow rates close to zero to be detected.

SUMMARY OF THE INVENTION

However, in a flow passage 14 having a cross section that is circular or rectangular in shape, regarding the stability of Karman vortexes, it is generally known that it is easy to bring about the influence of the aspect ratio shown by the following equation (2), and that the Karman vortex stability increases as the aspect ratio approaches 1.

$$1 \le \text{Aspect Ratio}=(\text{Horizontal Dimension of Flow Passage Cross Section})/(\text{Vertical Dimension of Flow Passage Cross Section}) \quad (2)$$

However, with the flow passage 14 of Laid-Open Patent Publication No. 11-006748 shown in FIG. 21C, to ensure a Reynolds number Re that enables measurement of minute flow rates close to zero, the distance (vertical dimension) Yg between the wall portion 14g and the wall portion 14h of the flow passage 14 is shortened, and the cross sectional area of the flow passage 14 is made smaller. Consequently, the aspect ratio becomes greater than 1 and stability of the Karman vortexes decreases. Owing thereto, the sensor element is greatly influenced by fluid turbulence when the sensor element detects the flow rate in a high flow velocity (large flow rate) region. As a result, as shown in FIG. 22, linearity of the frequency [Hz] at which Karman vortexes are generated with respect to volumetric flow rate [l/min] (i.e., linearity of a characteristic showing the relationship between volumetric flow rate and generation frequency) is significantly deteriorated in the large flow rate region.

Further, as shown in FIG. 22, the zero flow rate vicinity is made up from a "detection incapable region" in which detection of minute flow rates is impossible, and a "minute flow rate region" in which linearity of the frequency at which Karman vortexes are generated deteriorates. Also, between the minute flow rate region and a large flow rate region, a "stable flow rate region" exists in which linearity is not deteriorated.

The present invention has the aim of resolving the above-described problems. An object of the present invention is to provide a flow sensor having a flow passage configuration that ensures linearity (stability) of the frequency at which Karman vortexes are generated with respect to volumetric flow rate in a large flow rate region, together with enabling detection of minute flow rates close to zero.

As described above, in order to enable detection of minute flow rates close to zero, it is necessary to enhance the fluid inertial force by designing the cross sectional area of the flow passage to be small, while also suppressing the fluid viscous force and enhancing the Reynolds number, by designing the distance between the vortex generator and wall portions of the flow passage to be as large as possible.

Further, for improving stability of Karman vortexes in the high flow rate region, it is necessary for the aspect ratio to approach or be close to 1.

Thus, in the present invention, a structure is offered in which the flow sensor has a flow passage through which a fluid flows, a columnar vortex generator disposed transversely to a flow direction of the fluid in the interior of the flow passage, and a sensor element disposed in the interior of the flow passage further downstream in the flow direction than the vortex generator, such that, in an event that Karman vortexes are generated by the vortex generator upon flow of the fluid, the sensor element is capable of detecting a flow rate of the fluid based on a generated frequency of the Karman vortexes.

In addition to being premised on the aforementioned structure, with the flow sensor according to the present invention, a cross section of the flow passage perpendicular to the flow direction is defined by a first wall portion and a second wall portion, which face respective opposite ends of the vortex generator in an axial direction of the vortex generator, and a third wall portion and a fourth wall portion, which face respective opposite sides of the vortex generator in a widthwise direction perpendicular to the axial direction, and which connect the first wall portion and the second wall portion.

Additionally, with the flow sensor according to the present invention, in comparison with conventional techniques, the following characteristic configurations (1) through (3) are provided.

(1) A first dimension between the third wall portion and the fourth wall portion is longer than a second dimension between the first wall portion and the second wall portion. (2) The third wall portion and the fourth wall portion are formed in substantially straight lines along the vortex generator. (3) The first wall portion and the second wall portion are curved at a predetermined radius of curvature.

According to configuration (1), in the present invention, even if the cross sectional area of the flow passage is designed to be small, it is possible to set the distance longer between the vortex generator and the third wall portion and the fourth wall portion, whereby the fluid viscous force can be lowered.

Further, according to configuration (2), in the present invention, it becomes possible to change the radius of curvature of the first wall portion and the second wall portion without reliance on the aspect ratio of the flow passage, such that even if the aspect ratio is put close to 1, a shape of the flow passage is not brought about approximating a circular shape or a rectangular shape as viewed in cross section.

Further, because the third wall portion and the fourth wall portion are constituted as straight line sections, the distance between the third and fourth wall portions and the vortex generator is constant. As a result, change in the fluid viscous force along the axial direction of the vortex generator can be minimized.

Consequently, even with configuration (2), a rise in the fluid viscous force can be suppressed.

Furthermore, according to configuration (3), the first and second wall portions as long sides defining the flow passage can be curved to a degree such that the influence of the fluid viscous force does not become great. Consequently, while securing the distance between the vortex generator and the third and fourth wall portions, even in the case that the aspect ratio is close to 1, it is possible to suppress an increase in the cross sectional area of the flow passage. As a result, lowering of the fluid inertial force can be suppressed.

In this manner, with the flow sensor according to the present invention, by adopting configurations (1) through (3), it becomes possible to suppress a rise in the fluid viscous force due to wall surface resistance in a low flow velocity region, and the Reynolds number can be enhanced even in a minute flow rate region close to a zero flow rate. Further, as a result of the aspect ratio being close to 1, fluid turbulence can be suppressed in a high flow velocity (large flow rate) region.

Accordingly, with the present invention, linearity of the frequency [Hz] at which Karman vortexes are generated with respect to volumetric flow rate [l/min] in the large flow rate region can be stabilized, together with enabling detection of minute flow rates close to zero.

Further, in the present invention, the following configurations can also be adopted.

In the flow sensor, the vortex generator and the sensor element may be disposed at substantially central positions between the third wall portion and the fourth wall portion. As a result, the distance between the vortex generator and the third wall portion and the fourth wall portion can be lengthened, and the fluid viscous force can easily be lowered.

Further, in the flow sensor, the radius of curvature preferably is set between 15 [mm] and 40 [mm]. Consequently, in the vicinity of sides of the vortex generator, a high flow velocity distribution is brought about, and the sensor element can easily detect minute flow rates close to zero.

Further, in the flow sensor, the relationships Xc/W>0.9 and Xd/W>0.9 may be satisfied, where Xc is a distance between the third wall portion and the side of the vortex generator facing the third wall portion, Xd is a distance between the fourth wall portion and the side of the vortex generator facing the fourth wall portion, and W is a width of the vortex generator. Consequently, a decrease in alternating Karman vortex forces and/or lowering of the strength (structural integrity) of the vortex generator can be avoided.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a cross sectional view showing, in relation to the flow passage shown in FIG. 2, a case in which the aspect ratio is close to 1;

FIG. 9 is a chart for describing features of the flow passage of a first inventive example and flow passages of first through third comparative examples;

FIG. 10 is a chart showing measurement results of the first inventive example and the first through third comparative examples;

FIG. 13 is a chart for describing a flow passage of a second inventive example and a flow passage of a fourth comparative example;

FIG. 14 is a chart showing measurement results of the second inventive example and the fourth comparative example;

FIG. 17 is a graph for describing a case in which the radius of curvature of wall portions is changed;

FIG. 18 is a chart showing measurement results with respect to design conditions shown in FIG. 17;

FIG. 22 is a graph showing a relationship between volumetric flow rate of the fluid and linearity of Karman vortex frequency.

DESCRIPTION OF THE PREFERRED EMBODIMENTS

A preferred embodiment of a flow sensor according to the present invention will be described in detail below with reference to the drawings.

Figure 1:
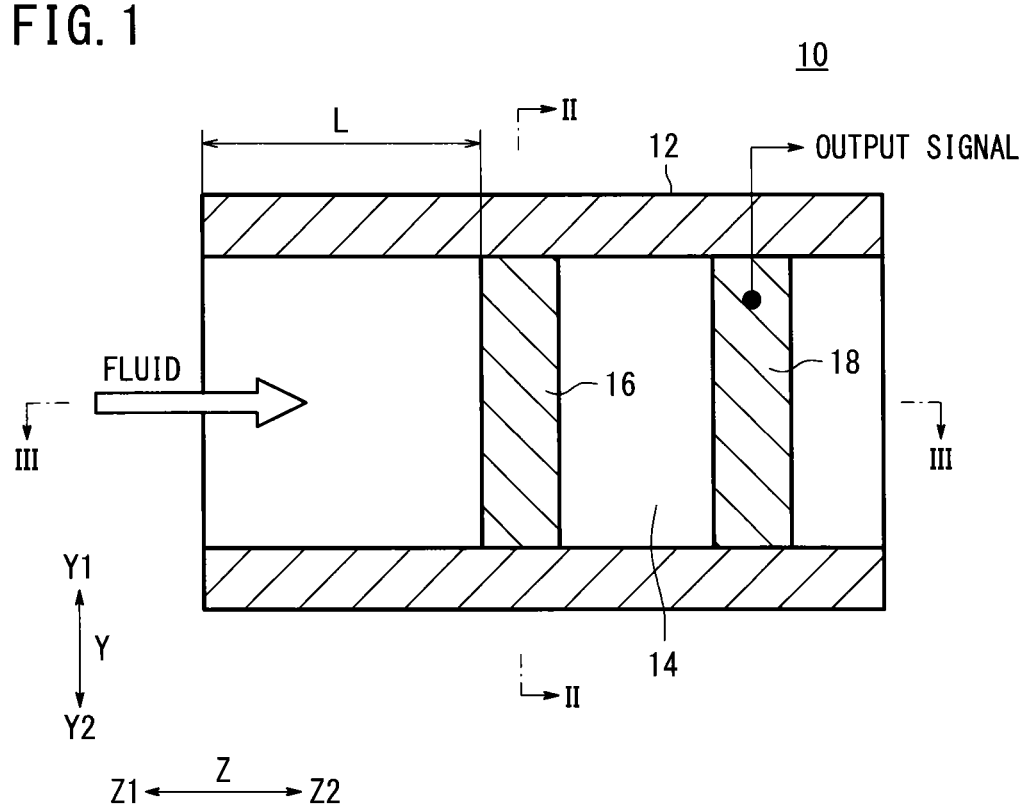
FIG. 1 is a cross sectional view showing in outline the structure of a flow sensor according to an embodiment of the present invention.
Figure 2:
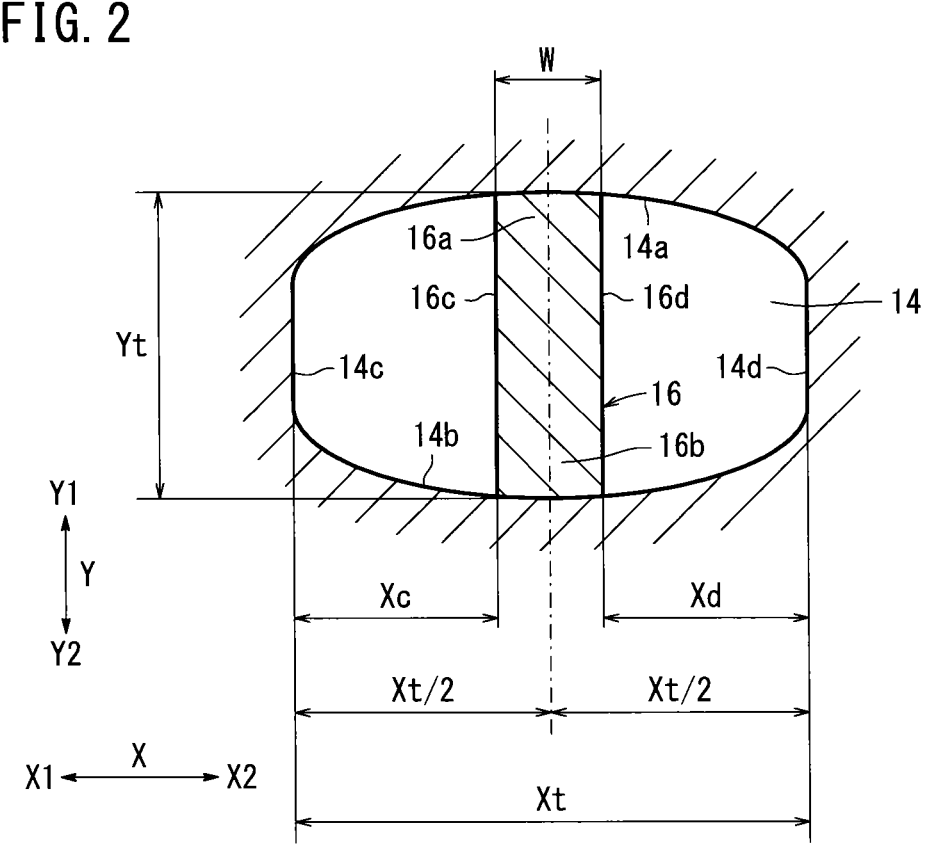
FIG. 2 is a cross sectional view taken along line II-II of FIG. 1.
Figure 3:
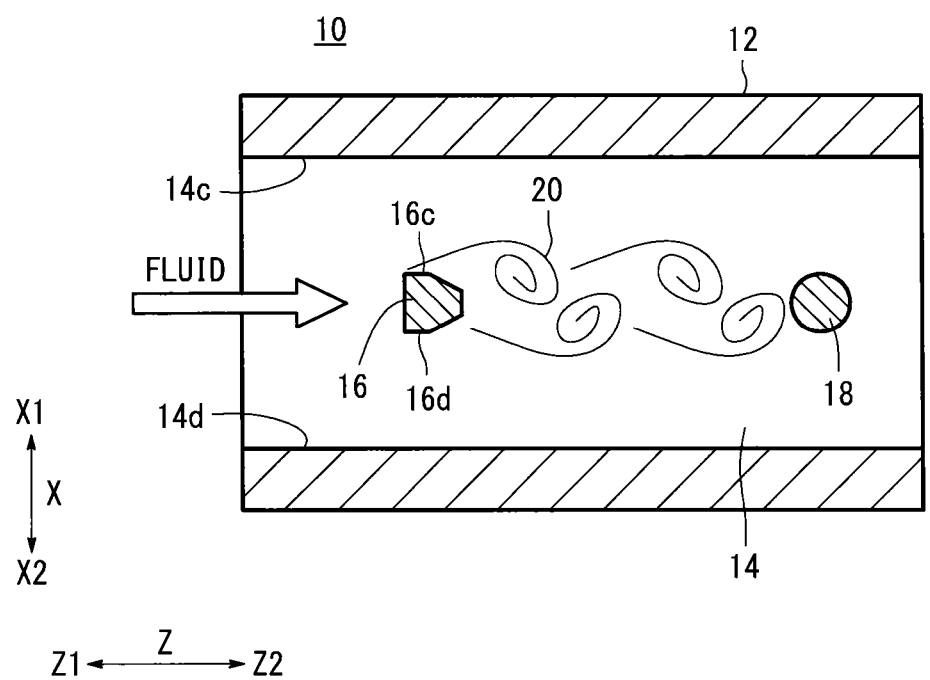
FIG. 3 is a cross sectional view taken along line III-III of FIG. 1.
Figure 21A:
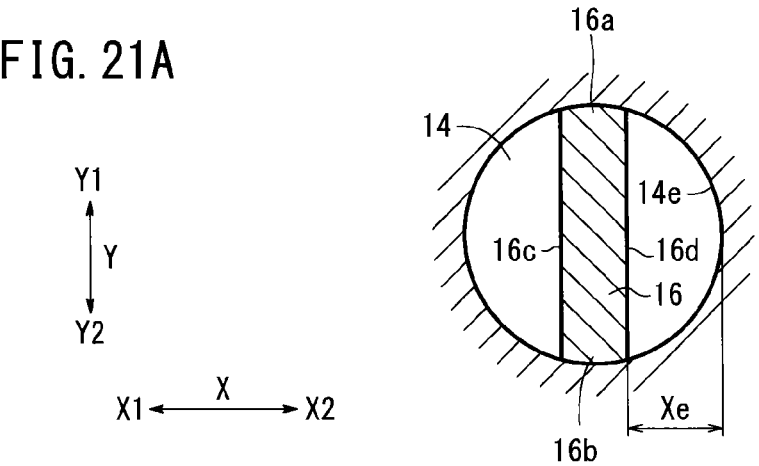
FIG. 21A and FIG. 21B are cross sectional views showing schematically flow passages having circular shapes in cross section.
Figure 21B:
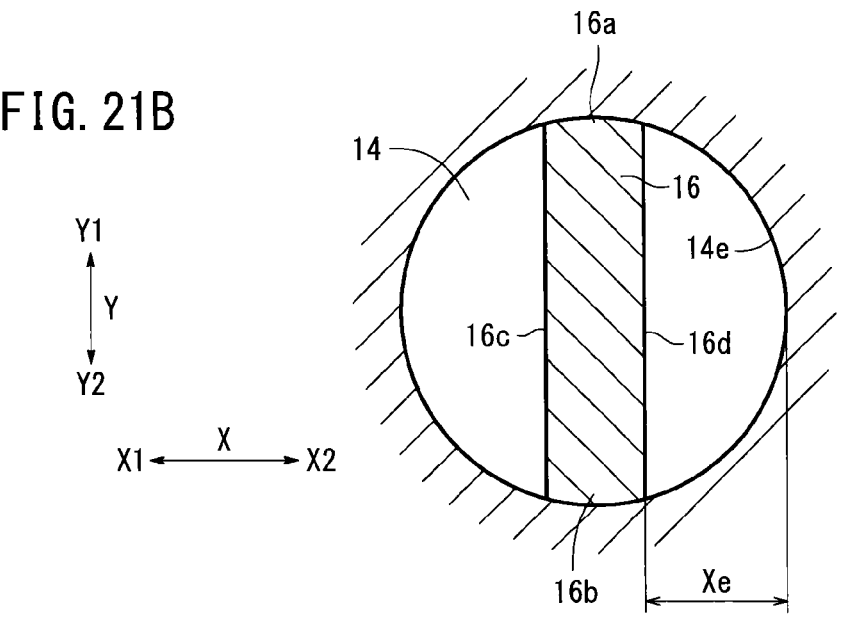
Figure 21C:
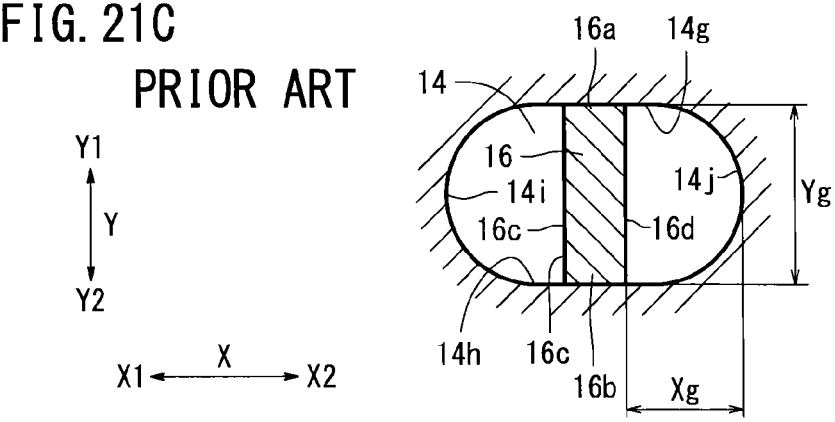
FIG. 21C is a cross sectional view depicting schematically the flow passage disclosed in Japanese Laid-Open Patent Publication No. 11-006748.

FIGS. 1 through 3 illustrate a flow sensor 10 according to an embodiment of the present invention. In the following explanations, constituent elements which are the same as the constituent elements shown in FIGS. 21A through 21C are designated using the same reference numerals.

The flow sensor 10 according to the present embodiment is constituted by arranging a columnar vortex generator 16 and a columnar sensor element 18 in series along a flow direction (i.e., a direction from Z1 to Z2) of the fluid in the interior of a flow passage 14 formed by a tubular body 12 along the Z direction. In this case, the vortex generator 16 and the sensor element 18 are erected respectively along the Y direction at substantially central positions in the widthwise direction (X direction) in the interior of the flow passage 14. Further, as shown in plan in FIG. 3, the vortex generator 16 is substantially pentagonal shaped as viewed in plan, the downstream side (Z2 direction side) thereof being tapered in the flow direction. Moreover, as shown in FIG. 1, the distance L from the inlet of the flow passage 14 to the vortex generator 16 defines a run-up section for the fluid.

As shown in FIG. 2, the cross section of the flow passage 14 perpendicular to the flow direction of the fluid is defined by facing wall portions 14a, 14b (first wall portion, second wall portion) that face respective ends 16a, 16b of the vortex generator 16 in the Y direction, and wall portions 14c, 14d (third wall portion, fourth wall portion) that face respective sides 16c, 16d of the vortex generator 16 in the X direction, and which connect the wall portions 14a, 14b.

In this case, the wall portions 14a, 14b, which act as wall surfaces of long sides (sides in the Y1, Y2 directions) of the flow passage 14, are curved at a predetermined radius of curvature R (R=15 [mm] to 40 [mm]), whereas the wall portions 14c, 14d, which act as wall surfaces of short sides (sides in the X1, X2 directions), are constructed as substantially parallel straight line sections on respective sides 16c, 16d of the columnar vortex generator 16.

If the distance (vertical dimension, second dimension) between a center portion of the wall portion 14a and a center point of the wall portion 14b is defined by Yt, and the distance (horizontal dimension, first dimension) between the wall portion 14c and the wall portion 14d is defined by Xt, then preferably Xt≥Yt in order for the aspect ratio of the flow passage to satisfy the above-mentioned equation (2). Since the vortex generator 16 is erected in a central position along the X direction in the interior of the flow passage 14, the vertical dimension Yt also is equivalent to the total length of the vortex generator 16.

Further, if the width between sides 16c, 16d of the vortex generator 16 is defined by W, the distance between the side 16c and the wall portion 14c is defined by Xc, and the distance between the side 16d and the wall portion 14d is defined by Xd, then preferably, the relationships Xc/W>0.9 and Xd/W>0.9 are satisfied.

In the flow sensor 10 constructed in the foregoing manner, when fluid flows in the interior of the flow passage 14 from Z1 to Z2, Karman vortexes 20 are generated on the downstream side of the vortex generator 16. More specifically, from the sides 16c, 16d of the vortex generator 16 toward the downstream side thereof, vortexes are generated in mutually opposite directions, and as a result, Karman vortexes 20 are formed as regular vortex trains.

The sensor element 18 includes a piezoelectric element or the like, and the sensor element 18 detects from the piezoelectric element alternating forces of alternately occurring vortex trains (Karman vortexes 20), detects the generation frequency [Hz] (generation period [s]) at which Karman vortexes 20 are generated based on the detected alternating forces, and detects the flow velocity [m/s] or the volumetric flow rate [l/min] of the fluid from the detected generation frequency. Concerning the detection method of the generation frequency [Hz] at which Karman vortexes 20 are generated at the sensor element 18, and the detection method of the flow velocity [m/s] and volumetric flow rate [l/min] of the fluid, since methods therefor are already disclosed, for example, in Japanese Laid-Open Patent Publication No. 11-006748 and Japanese Laid-Open Patent Publication No. 09-089613, detailed descriptions of these methods are omitted.

Next, advantages and effects of the flow sensor 10 constructed as described above will be explained with reference to FIGS. 4A through 20. In the following explanations, FIGS. 1 through 3 and FIGS. 21A through 22 may also be referred to as needed.

Figure 4A:
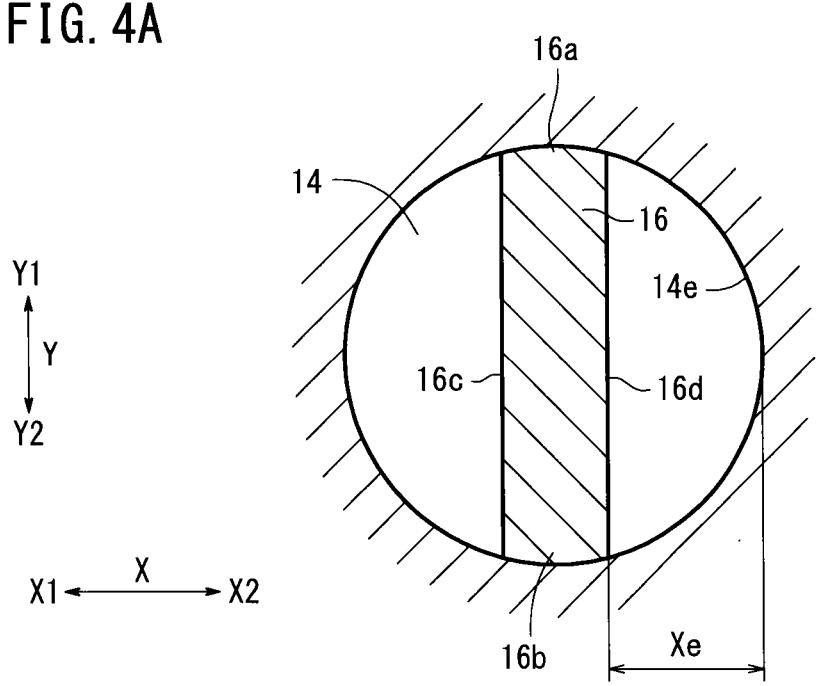
FIG. 4A is a cross sectional view in which a flow passage having a circular shape in cross section is depicted schematically.
Figure 4B:
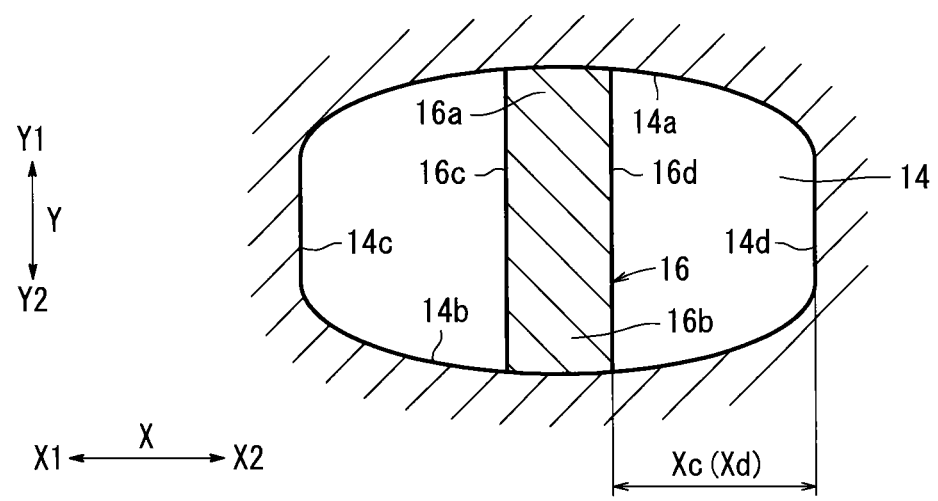
FIG. 4B is a cross sectional view in which the flow passage shown in FIG. 2 is depicted schematically.

FIG. 4A is a view depicting schematically a cross sectional configuration of the conventional flow passage 14 shown in FIGS. 21A and 21B. FIG. 4B is a view depicting schematically a cross sectional configuration of the flow passage 14 of the flow sensor 10 shown in FIG. 2.

With the cross sectional configuration of FIG. 4A, and also as described above in relation to FIGS. 21A and 21B, if the cross sectional area of the flow passage 14 is designed to be small, the distance Xe becomes shorter in the vicinity of the ends 16a, 16b of the vortex generator 16, and the fluid viscous force increases.

In contrast thereto, with the cross sectional configuration of the present embodiment shown in FIG. 4B, compared to the vertical dimension Yt, the horizontal dimension Xt has a longer shape (Xt≥Yt), and even if the cross sectional area of the flow passage 14 is designed to be small, the lengths of the distances Xc, Xd can be set longer. As a result, compared to the cross sectional configuration of FIG. 4A, the fluid viscous force can be decreased.

Differences between the cross sectional configuration of FIG. 4A and the cross sectional configuration of FIG. 4B will be described in greater detail with reference to FIGS. 5A through 5C.

Figure 5A:
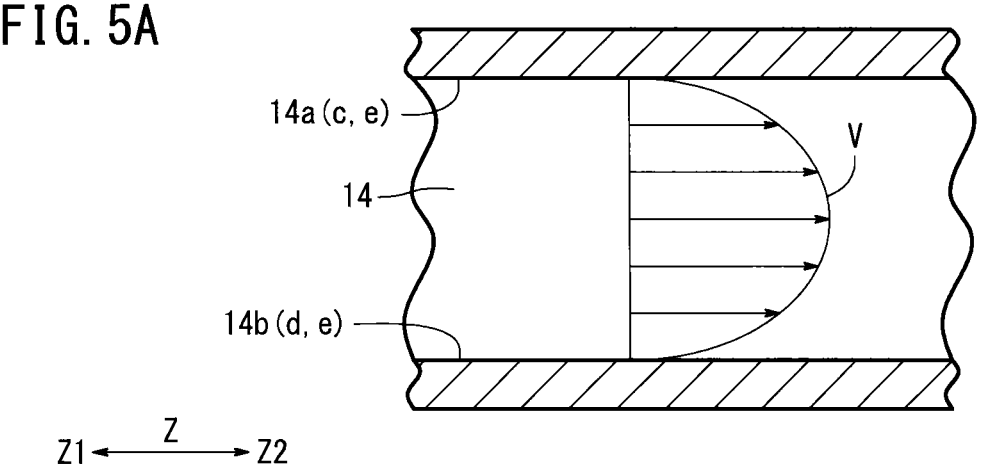
FIG. 5A is an explanatory drawing showing schematically a velocity distribution of the fluid in the interior of the flow passage.

As shown in FIG. 5A, theoretically, the flow velocity distribution of the fluid that flows in the interior of the flow passage 14 is such that the flow velocity V is zero [m/s] at the wall portions 14a through 14e as wall surfaces, and the flow velocity V is maximum at a center position of the two wall portions 14a through 14e. In this case, since the fluid viscous force works in a direction to suppress changes (flows) of the fluid, the fluid viscous force in the vicinity of the wall portions 14a to 14e becomes extremely large.

Figure 5B:
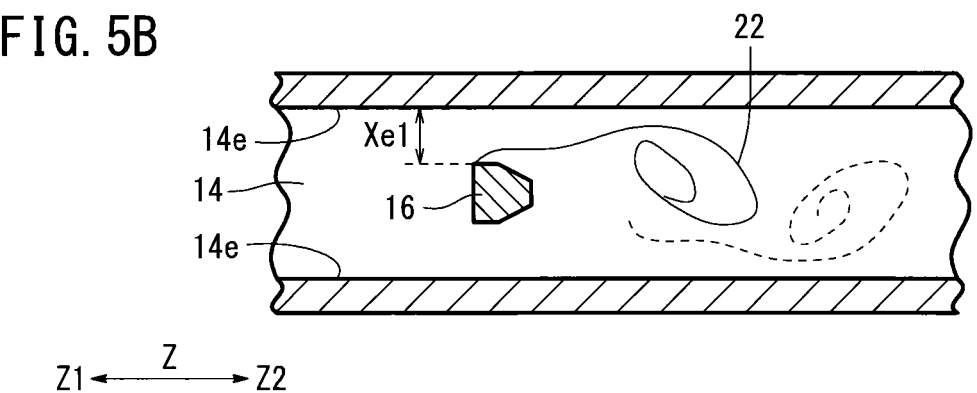
FIG. 5B and FIG. 5C are explanatory drawings showing schematically generation of Karman vortexes in the flow passage shown in FIG. 4A.

FIG. 5B is an explanatory drawing depicting generation of Karman vortexes 22 on a downstream side of ends 16a, 16b of the vortex generator 16 in the configuration of FIG. 4A, in which the distance between the wall portion 14e and ends 16a, 16b of the sides 16c, 16d is indicated by Xe1. Further, FIG. 5C is an explanatory drawing depicting generation of Karman vortexes 22 generated on a downstream side of a central position of the vortex generator 16, in which the distance between central positions of the sides 16c, 16d and the wall portion 14e is indicated by Xe2.

As shown in FIG. 5B, for a case in which the distance (distance Xe1) between the wall portion 14e and the vortex generator 16 is short, large fluid viscous forces are easily generated, and in a minute flow rate region close to zero, the fluid viscous force becomes large compared to the fluid inertial force. As a result, the Reynolds number Re decreases and it is difficult for Karman vortexes 22 to be generated, together with the occurrence of turbulence in the Karman vortexes 22. In FIG. 5B, the Karman vortex 22 as originally intended to be generated is shown by the broken line.

Figure 5C:
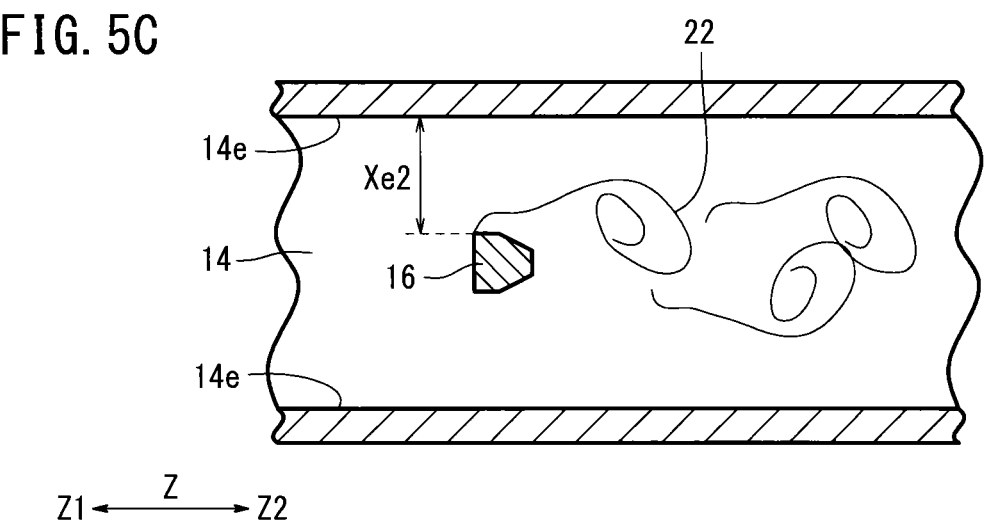

For this reason, as shown in FIG. 5C, on the downstream side of the central positions of sides 16c, 16d, an influence is imparted from the downstream side of the ends 16a, 16b of the vortex generator 16 shown in FIG. 5B, and the Karman vortexes 22 are subjected to turbulence and become disordered.

In contrast thereto, with the cross sectional configuration of the present embodiment shown in FIG. 4B, because the wall portions 14c, 14d, which act as short sides constituting the flow passage 14, are constituted in straight line shapes, the distance (distance Xc, Xd) between the wall portions 14c, 14d and the vortex generator 16 can be kept constant, and stability of the Karman vortexes can be improved.

Figure 6A:
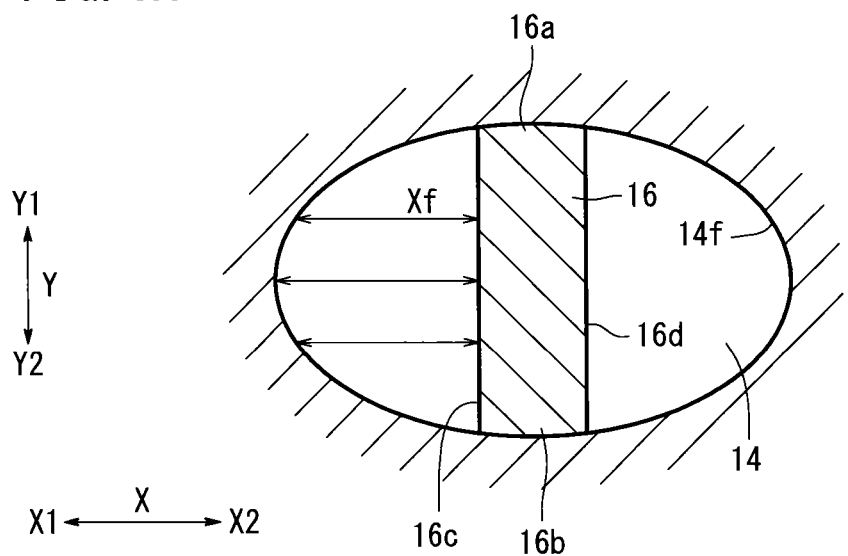
FIG. 6A is a cross sectional view in which a flow passage having an elliptical shape in cross section is depicted schematically.

FIG. 6A is a cross sectional view in which a flow passage 14 having an elliptical shape in cross section is depicted schematically.

In this case, if the aspect ratio of the flow passage 14 is to be modified, then among the wall portions 14f of the flow passage 14, the radius of curvature R of the upper and lower wall surfaces (wall surfaces in the Y1, Y2 direction) is changed. Owing thereto, as the aspect ratio approaches 1, a shape which is close to the circular cross sectional shape of the flow passage 14 shown in FIG. 4A is brought about, and concerning minute flow rates close to zero, it becomes difficult for the Reynolds number Re to be enhanced.

Figure 6B:
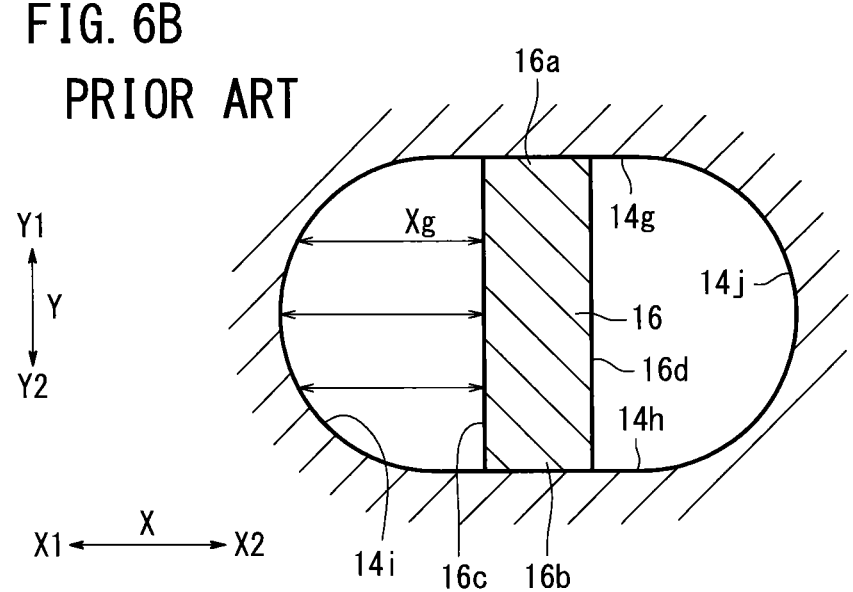
FIG. 6B is a cross sectional view in which the flow passage of Japanese Laid-Open Patent Publication No. 11-006748 is depicted schematically.

FIG. 6B is a cross sectional view in which the flow passage 14 of Japanese Laid-Open Patent Publication No. 11-006748 is depicted schematically.

In FIG. 6B, because the short side wall portions 14i, 14j constituting the flow passage 14 are semicircular in shape, if the aspect ratio is made close to 1, then similar to the case of FIG. 6A, a shape that is close to the circular cross sectional shape of the flow passage 14 in FIG. 4A is brought about. Consequently, in this case as well, concerning minute flow rates close to zero, it is difficult for the Reynolds number Re to be enhanced.

In contrast thereto, with the cross sectional configuration of the present embodiment shown in FIG. 4B, because the short side wall portions 14c, 14d are formed as linear sections, the radius of curvature R of the upper and lower long side wall portions 14a, 14b can be changed without reliance on the aspect ratio of the flow passage 14. Consequently, as shown in FIG. 7, with the cross sectional configuration of the present embodiment, even if the aspect ratio is made close to 1, a shape does not occur which is close to the circular cross sectional shape of the flow passage 14 shown in FIG. 4A.

Further, because the wall portions 14c, 14d are formed in straight lines, as noted previously, the distance (distance Xc, Xd) between the wall portions 14c, 14d and the vortex generator 16 can be kept constant, and changes in the fluid viscous force along the Y direction of the vortex generator 16 can be minimized.

In this manner, with the present embodiment, by making the wall portions 14c, 14d linear or shaped as straight lines, a rise in the fluid viscous force can be suppressed.

Figure 8A:
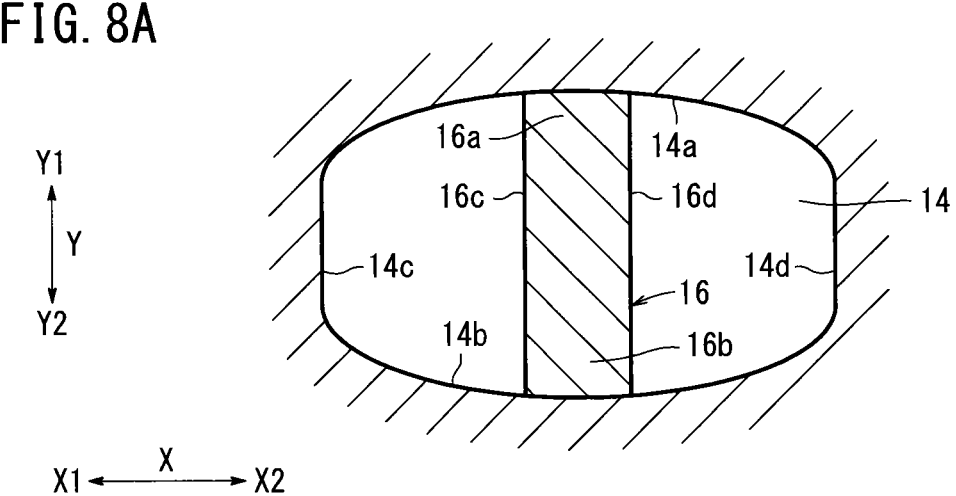
FIG. 8A is a cross sectional view in which the flow passage shown in FIG. 2 is depicted schematically.
Figure 8B:
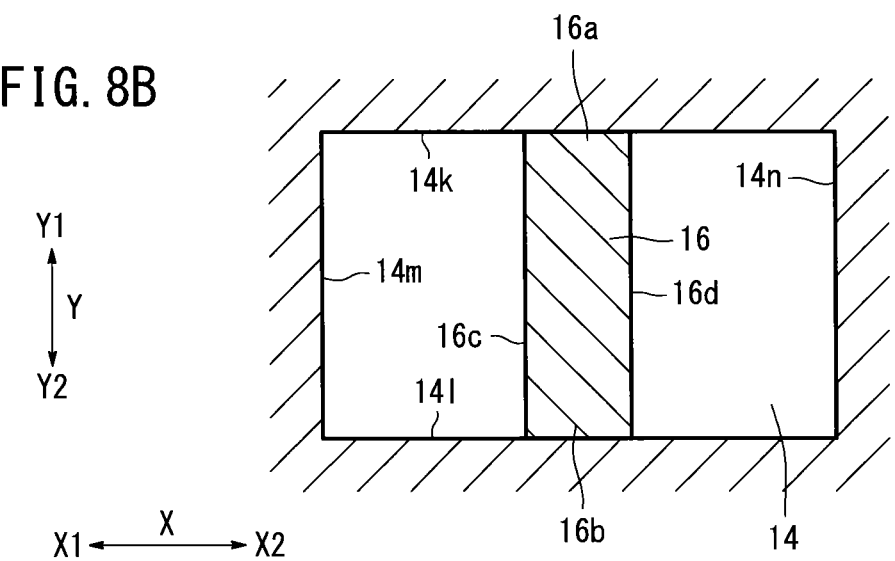
FIG. 8B is a cross sectional view in which the flow passage with a rectangular cross sectional shape and having the same aspect ratio as the flow passage of FIG. 8A is depicted schematically.

FIG. 8A shows the cross sectional configuration of the present embodiment, and FIG. 8B shows the cross sectional configuration of a flow passage 14 with a rectangular cross sectional shape and having the same aspect ratio as that of the flow passage 14 in FIG. 8A.

In the case of FIG. 8B, although the distance between the wall portions 14m, 14n and the vortex generator 16 is kept constant due to the fact that the wall portions 14m, 14n are linear, since a rectangular cross sectional flow passage 14 is provided in which each of the wall portions 14k through 14n has a linear or straight line shape, if the aspect ratio is made to approach 1 while maintaining the aforementioned distance at a certain length, the cross sectional area of the flow passage 14 becomes too large and the fluid inertial force decreases disadvantageously.

In contrast thereto, with the cross sectional configuration of the present embodiment shown in FIG. 8A, by curving the long side wall portions 14a, 14b to such a degree (R=15 [mm] to 40 [mm]) that the influence of the fluid viscous force does not become too large, even in the case that the aspect ratio approaches 1 while maintaining the distance (distance Xc, Xd) between the wall portions 14c, 14d and the vortex generator 16, an increase in the cross sectional area of the flow passage 14 can be suppressed. As a result, a decrease in the fluid inertial force can be suppressed.

Next, effects of the flow sensor 10 according to the present embodiment will be described in greater detail with reference to FIGS. 9 through 20.

FIGS. 9 through 12 indicate results in which generated frequencies of Karman vortexes 20, 22 (see FIGS. 3, 5B and 5C) are measured when a fluid flows through respective flow passages 14, concerning the cross sectional configuration of the flow passage 14 according to the present embodiment (Inventive Example 1), and cross sectional configurations of conventional flow passages 14 (Comparative Examples 1 through 3).

Inventive Example 1 is the flow passage 14 of the present embodiment shown in FIGS. 1 to 3, FIG. 4B, and FIG. 8A. Further, Comparative Example 1 is a flow passage 14 having the circular cross sectional shape shown in FIG. 4A, Comparative Example 2 is a flow passage 14 having the rectangular cross sectional shape shown in FIG. 8B, and Comparative Example 3 is a flow passage 14 having the elliptical cross sectional shape shown in FIG. 6A.

FIG. 9 is a chart indicating shapes of the flow passage 14 of Inventive Example 1 and flow passages 14 of Comparative Examples 1 through 3.

In FIG. 9, "total length (Z)" defines the length of the flow passage 14 along the Z direction, "vertical (Y)" defines the maximum length of the flow passage 14 in the Y direction, and "horizontal (X)" defines the maximum length of the flow passage 14 in the X direction. Further, "radius of curvature (R)" defines the radius of curvature R of the wall portions 14a, 14b in the flow passage 14 of Inventive Example 1.

With Inventive Example 1 and Comparative Examples 1 through 3, in the event that the volumetric flow rate of the fluid is 4 [l/min], the fluid flows through the flow passage 14 at a flow velocity V of 6.4 [m/s] to 7.1 [m/s], whereupon the generation frequencies (measurement frequencies) [Hz] of Karman vortexes 20, 22 generated at that time, and the volumetric flow rate [l/min] were measured by the sensor element 18.

FIG. 10 is a chart showing measurement results by the sensor element 18. In FIG. 10, "minimum measured flow rate" indicates a minimum value of the volumetric flow rate capable of being measured by the sensor element 18, and "measurement frequency" indicates the maximum value detected by the sensor element 18 of frequencies at which Karman vortexes 20, 22 are generated within a volumetric flow rate range of 0 to 4.0 [l/min].

As shown in FIG. 10, in comparison to Comparative Examples 1 through 3, with Inventive Example 1, the minimum measured flow rate is small, and the measured frequency is large.

Figure 11:
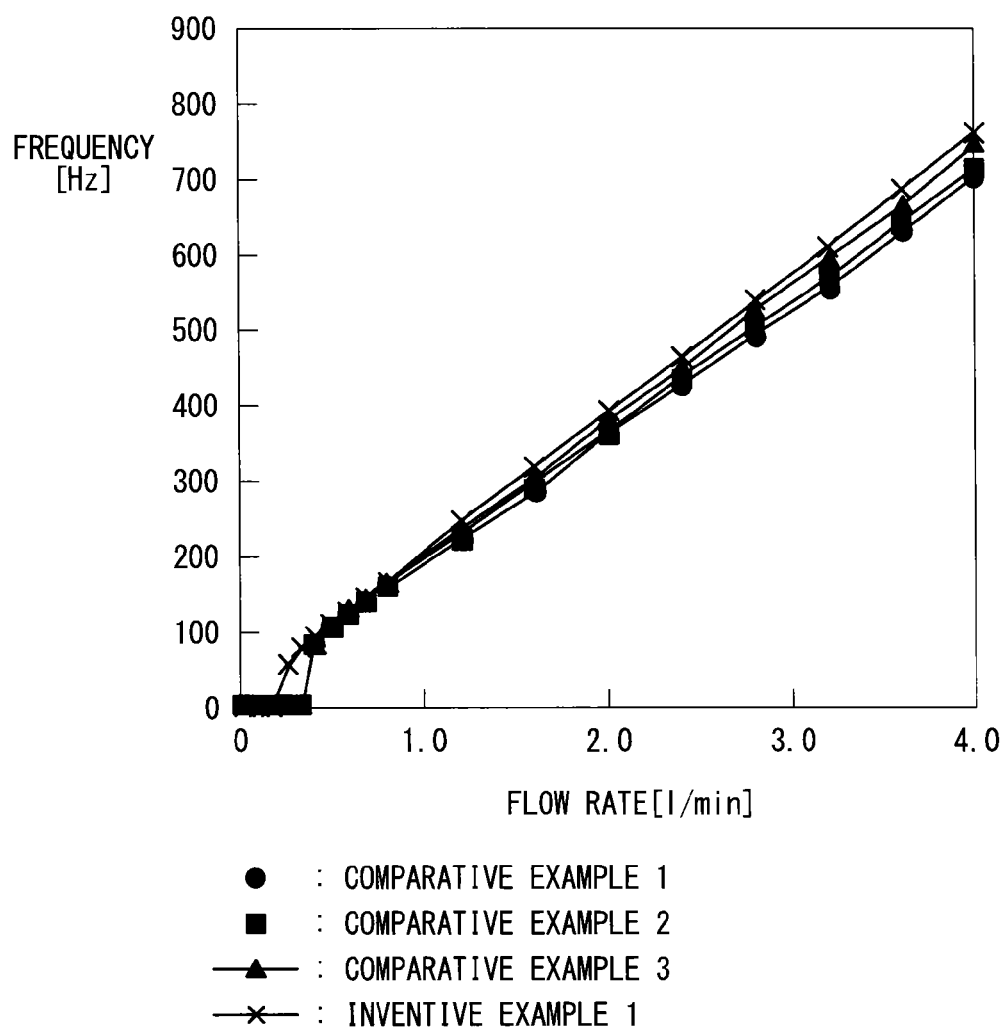
FIG. 11 is a graph showing a relationship between volumetric flow rate of the fluid and Karman vortex frequency.
Figure 12:
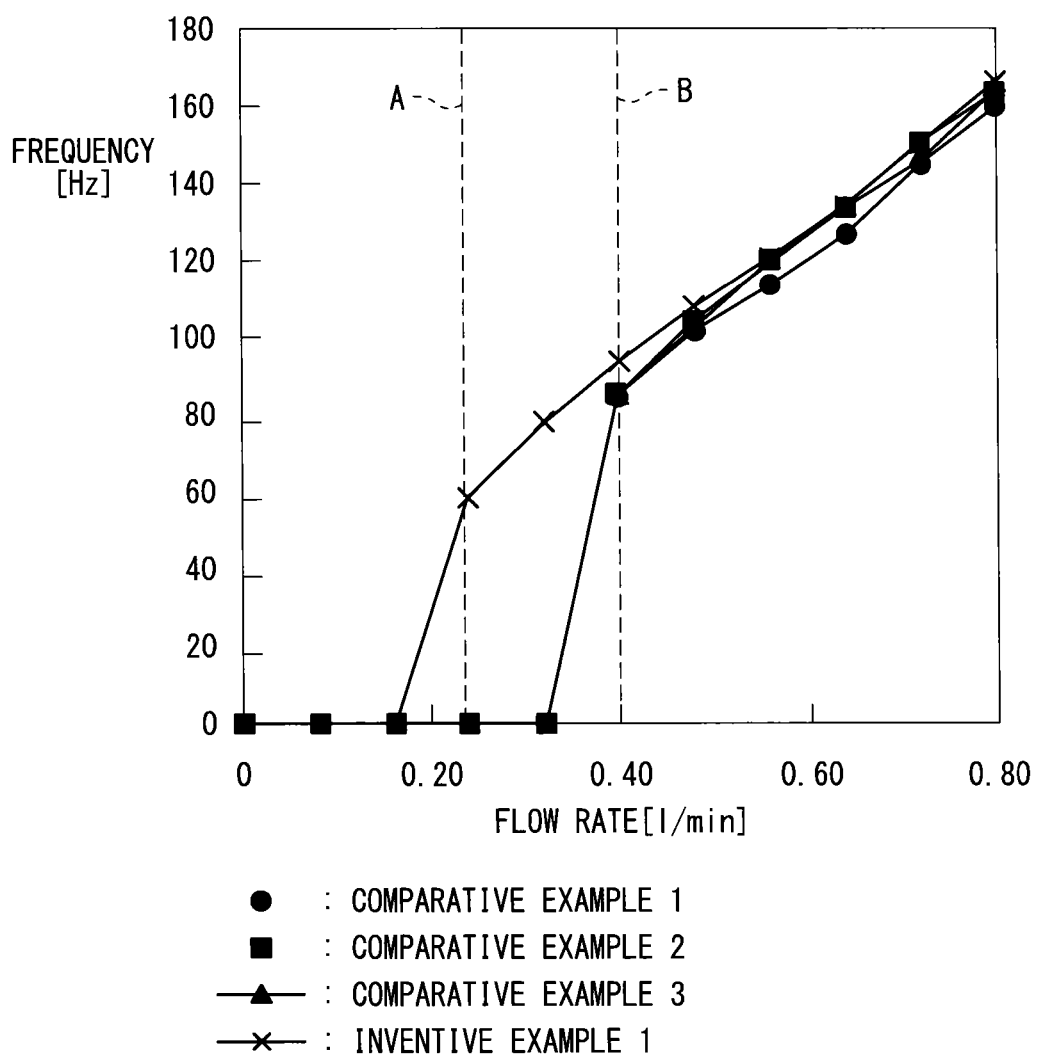
FIG. 12 is a graph showing a relationship between volumetric flow rate of the fluid and Karman vortex frequency.

Further, FIG. 11 is a graph in which the measurement frequency and volumetric flow rate measured by the sensor element 18 are plotted, and FIG. 12 is a graph in which a low flow rate region at or below 0.80 [l/min] in FIG. 11 is shown at an enlarged scale.

As shown in FIGS. 11 and 12, in comparison with Comparative Examples 1 through 3, with Inventive Example 1, lower volumetric flow rates can be detected, and together therewith, at the same volumetric flow rate, larger measurement frequencies can be detected. More specifically, as shown in FIGS. 10 and 12, in contrast to 0.40 [l/min] being the minimum measured flow rate in Comparative Examples 1 to 3 as shown by the broken line B, in Inventive Example 1, the minimum measured flow rate becomes smaller, up to 0.24 [l/min], as shown by the broken line A.

In the case of Inventive Example 1, the short side wall portions 14c, 14d of the flow passage 14 are defined by straight line sections, and the distance between the wall portions 14c, 14d and the vortex generator 16 is constant. Further, as a result of the long side wall portions 14a, 14b being curved, lowering of the fluid inertial force together with rising of the fluid viscous force are prevented. As a result, with Inventive Example 1, minute flow rates close to zero can easily be measured.

FIGS. 13 through 16 indicate measurement results of frequencies at which Karman vortexes 20, 22 are generated when fluid flows through the respective flow passages 14, concerning the cross sectional configuration of the flow passage 14 of the present embodiment (Inventive Example 2), and the cross sectional configuration of the flow passage 14 of Japanese Laid-Open Patent Publication No. 11-006748 (Comparative Example 4).

FIG. 13 is a chart that indicates the shapes of respective flow passages 14 of Inventive Example 2 and Comparative Example 4. In FIG. 13, "cross sectional area (S)" indicates the cross sectional area of the flow passage 14. In both Inventive Example 2 and Comparative Example 4, frequencies (measurement frequencies) [Hz] at which Karman vortexes 20, 22 are generated when fluid flows through the flow passage 14, and the volumetric flow rate [l/min] of the fluid were measured by the sensor element 18.

FIG. 14 is a chart showing measurement results of the sensor element 18.

In FIG. 14, "frequency characteristics" indicate generated frequencies (measured frequencies) of Karman vortexes 20, 22 measured by the sensor element 18 at a volumetric flow rate of 4.0 [l/min].

Figure 15:
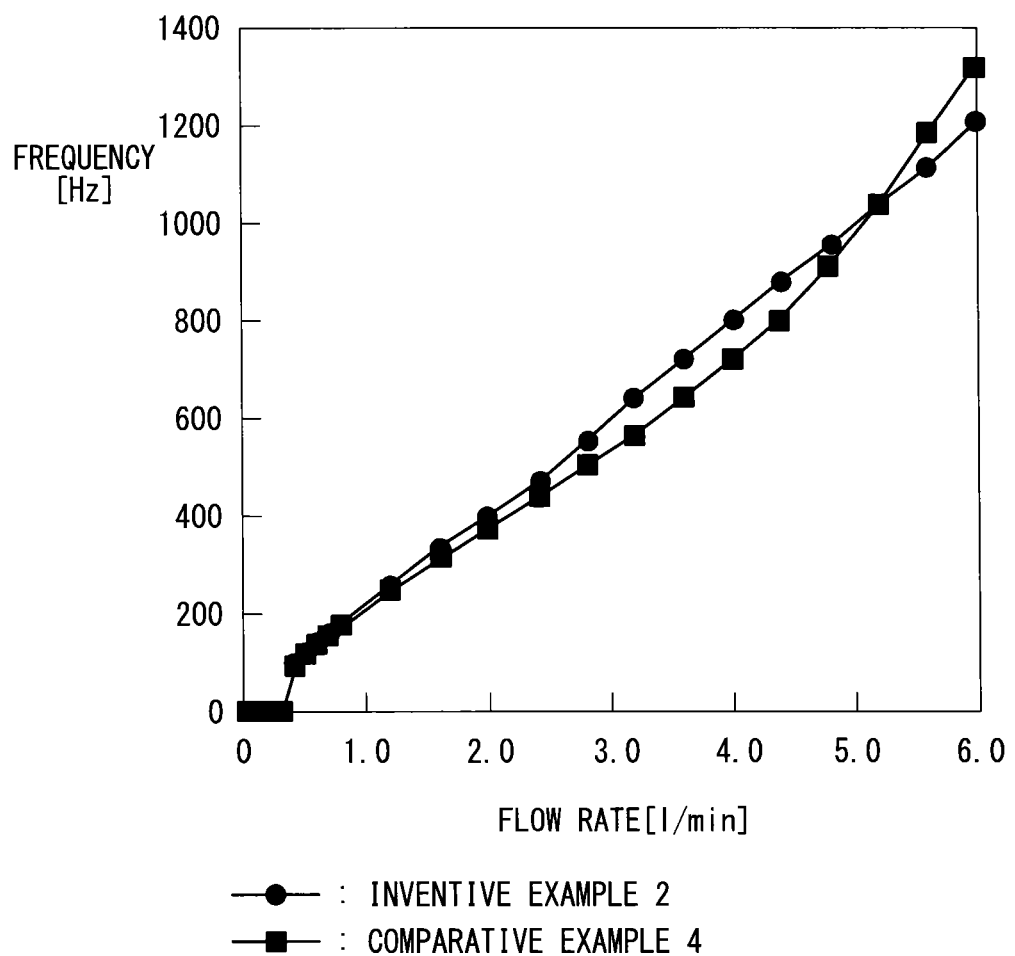
FIG. 15 is a graph showing a relationship between volumetric flow rate of the fluid and Karman vortex frequency.

Further, "linearity" indicates the degree to which an error exists with respect to the full scale of measured frequencies, or more specifically, in the graph of FIG. 15, indicates the size of a shift amount (error) of the measured frequency with respect to a straight line, in the case that values of measured frequencies are connected by one straight line from a measured frequency value of 0 [l/min] to a measured frequency value of 4.0 [l/min].

In FIG. 14, a maximum error on the positive side "+Max [%] F.S." and a maximum error on the negative side "−Max [%] F.S." within a volumetric flow rate range of 0 to 4.0 [l/min], and a maximum error on the positive side "+Max [%] F.S." and a maximum error on the negative side "−Max [%] F.S." within a volumetric flow rate range of 4.0 to 6.0 [l/min] are indicated, respectively.

As shown in FIG. 14, in comparison with Comparative Example 4, in Inventive Example 2, the measured frequency at a volumetric flow rate of 4.0 [l/min] is high, and the absolute value of the maximum error also is low.

Figure 16:
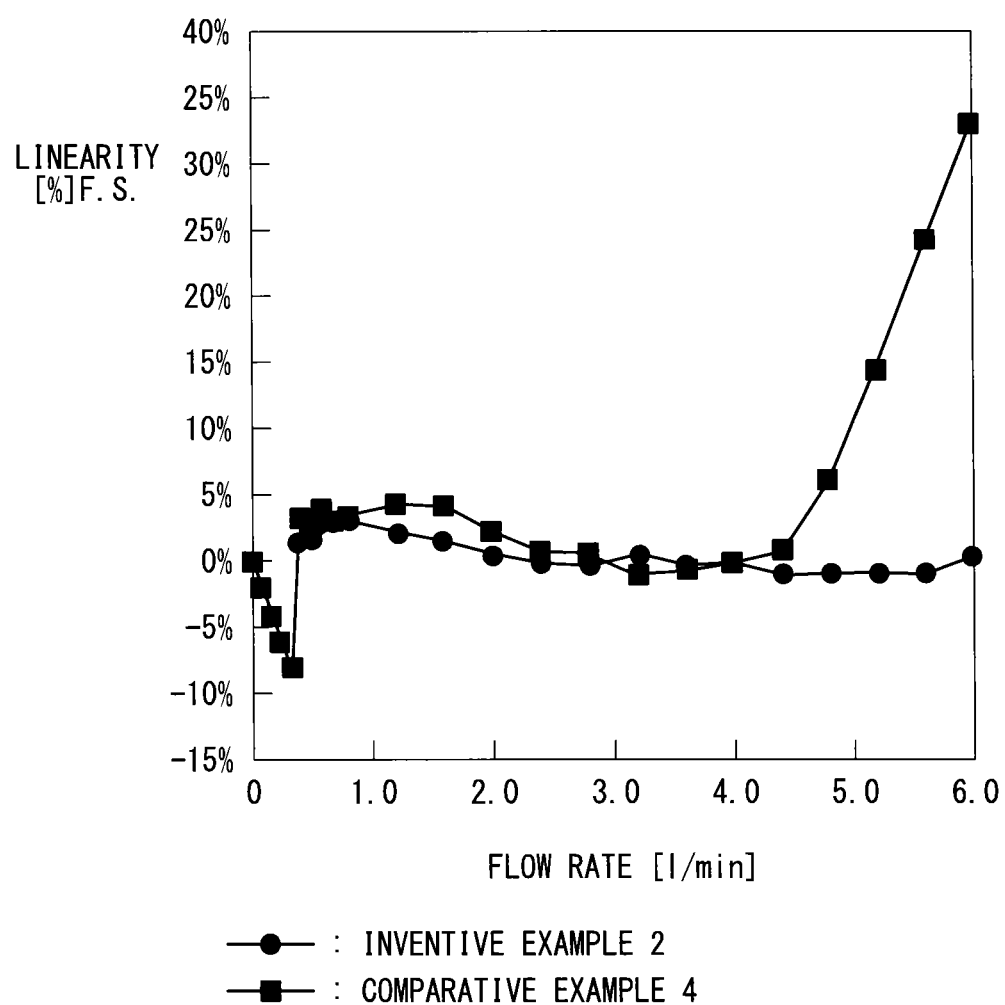
FIG. 16 is a graph showing a relationship between volumetric flow rate of the fluid and linearity of the Karman vortex frequency.

Further, FIG. 15 is a graph in which measured frequencies and volumetric flow rates measured by the sensor element 18 are plotted, whereas FIG. 16 is a graph in which, using the data of FIG. 15, the size of errors in the measured frequencies are plotted.

As shown in FIGS. 15 and 16, with Comparative Example 4, in a high flow rate region equal to or greater than 4.0 [l/min], linearity of the frequency becomes disturbed. In contrast thereto, with Inventive Example 2, a disturbance in linearity as in Comparative Example 4 does not occur (linearity of frequency is maintained), and errors in the measured frequency are small even in the high flow rate region or in the vicinity of a zero flow rate.

In the flow passage 14 of Japanese Laid-Open Patent Publication No. 11-006748, in simple terms, because a cross sectional configuration is provided to enhance the Reynolds number by shortening the vertical dimension Yg, in the event that the aspect ratio is raised, there is a tendency for frequency linearity to become deteriorated in the high flow rate region.

In contrast thereto, with Inventive Example 2, although the vertical dimension Yt is shorter than the horizontal dimension Xt, since the short side wall portions 14c, 14d are formed as straight line sections, in the case that the aspect ratio is raised while maintaining the distance (distance Xc, Xd) between the wall portions 14c, 14d and the vortex generator 16, frequency linearity can be stabilized even in the high flow rate region.

FIGS. 17 through 20 show measurement results of frequencies at which Karman vortexes 20 are generated when fluid flows through flow passages 14 having different radii of curvature R, for cases (Conditions 1 through 6) in which the radius of curvature R of the wall portions 14a, 14b is changed, in relation to the cross sectional configuration of the flow passage 14 according to the present embodiment.

FIG. 17 is a chart indicating cross sectional configurations of the flow passages 14 of Conditions 1 through 6. In such cases as well, the frequencies (measurement frequencies) at which Karman vortexes 20 are generated with respect to volumetric flow rates from 0 to 4.0 [l/min] were measured by the sensor element 18.

FIG. 18 is a chart indicating measurement results obtained by the sensor element 18. As shown in FIG. 18, in comparison with the other Conditions 1, 5 and 6 (R=∞, 10, 5 [mm]), in the case of Condition 2 (R=40 [mm]), Condition 3 (R=20 [mm]), and Condition 4 (R=15 [mm]), the minimum measured flow rate is small, and the measurement frequency is large.

Figure 19:
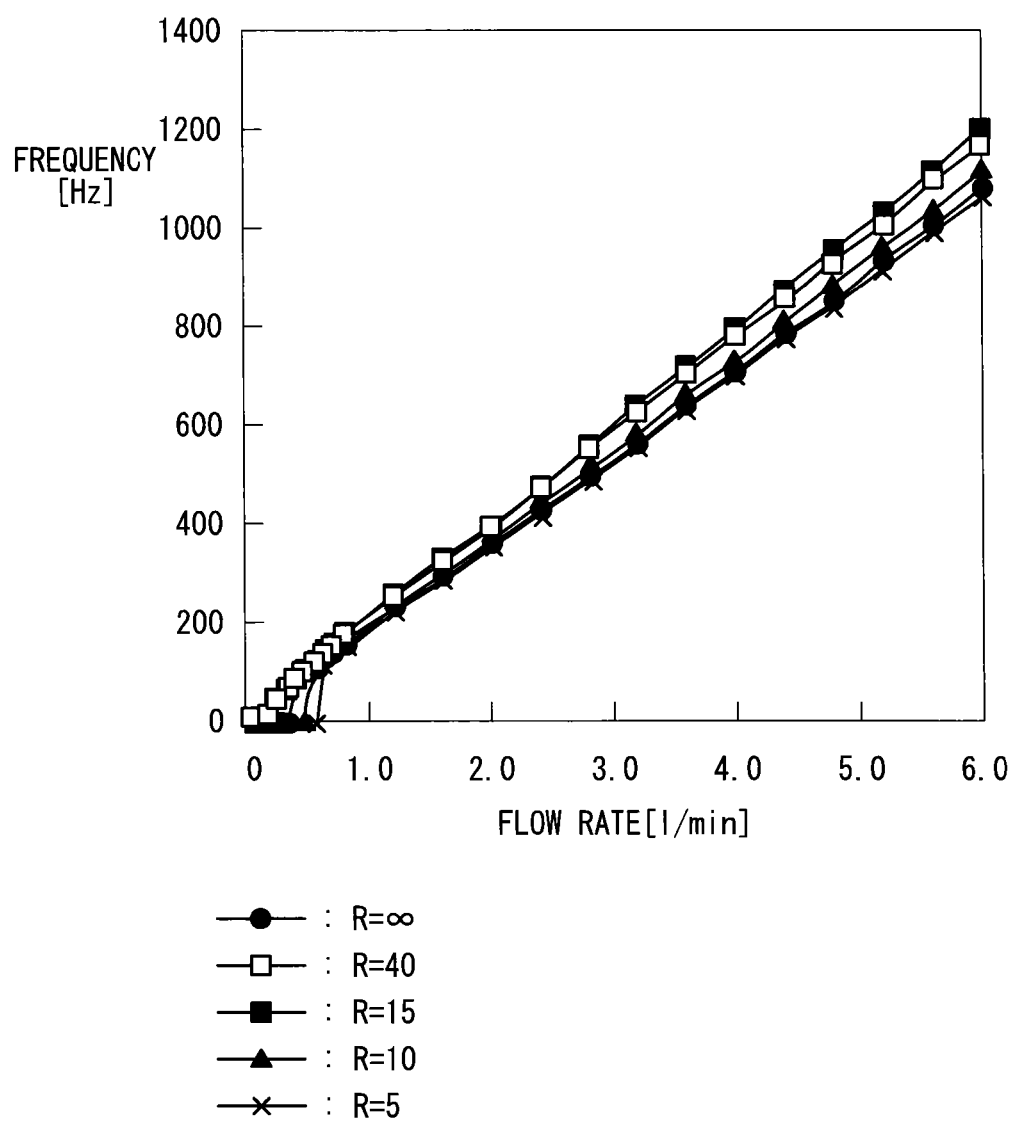
FIG. 19 is a graph showing a relationship between volumetric flow rate of the fluid and Karman vortex frequency.
Figure 20:
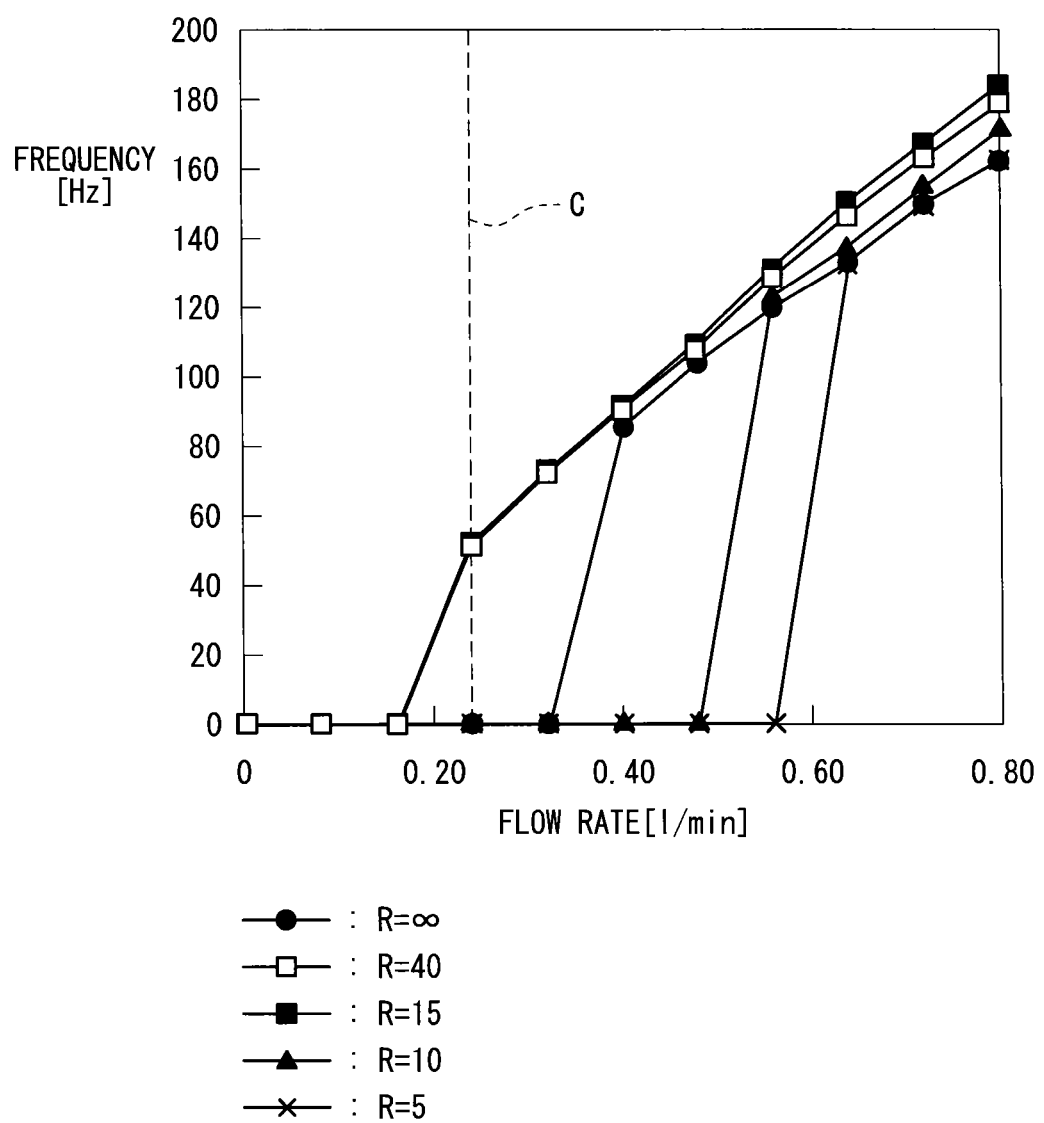
FIG. 20 is a graph showing a relationship between volumetric flow rate of the fluid and Karman vortex frequency.

Further, FIG. 19 is a graph in which measurement frequencies and volumetric flow rates measured by the sensor element 18 are plotted, and FIG. 20 is a graph in which a low flow rate region at or below 0.80 [l/min] in FIG. 19 is shown at an enlarged scale. Concerning Condition 3 (R=20 [mm]) and Condition 4 (R=15 [mm]), because the same measurement results were obtained, Condition 3 has been omitted and is not shown in FIGS. 19 and 20. Stated otherwise, in FIGS. 19 and 20, the measurement results of Condition 4 can also be regarded as measurement results for Condition 3.

As shown in FIGS. 19 and 20, in comparison with the other Conditions 1, 5 and 6 (R=∞, 10, 5 [mm]), with Condition 2 (R=40 [mm]), Condition 3 (R=20 [mm]), and Condition 4 (R=15 [mm]), lower flow rates can be detected, and larger measurement frequencies can be detected at the same flow rate. More specifically, as shown in FIG. 20, with Conditions 2 through 4, the value 0.24 [l/min] shown by the broken line C is the minimum measured flow rate, which is lower than the minimum measured flow rates of the other Conditions 1, 5 and 6.

If the radius of curvature R of the long side wall portions 14a, 14b is too short, the fluid viscous force in the vicinity where the wall portions 14a, 14b and the ends 16a, 16b of the vortex generator 16 are in contact rises, and it becomes difficult to detect minute flow rates close to zero. Further, if the radius of curvature R is too large, because the cross sectional area of the flow passage 14 increases and the fluid inertial force is lowered, in this case as well, it becomes difficult to detect minute flow rates close to zero.

Accordingly, as shown in FIGS. 17 through 20, assuming that the radius of curvature R is set to a value within the range from R=15 [mm] to 40 [mm], in which the values 40 [mm], 20 [mm], and 15 [mm] of Conditions 2 through 4 are included, it becomes possible to easily detect minute flow rates close to zero.

As described above, in the flow sensor 10 according to the present embodiment, (1) the horizontal dimension Xt between the wall portions 14c, 14d is longer than the vertical dimension Yt between the wall portions 14a, 14b (Xt≥Yt), (2) the wall portions 14c, 14d are constituted as straight line sections along the sides 16c, 16d of the vortex generator 16, and (3) the wall portions 14a, 14b are curved at a predetermined radius of curvature R.

Consequently, in the present embodiment, owing to the aforementioned configuration (1), even if the cross sectional area S of the flow passage 14 is designed to be small, it becomes possible to set the distance Xc, Xd between the wall portions 14c, 14d and the sides 16c, 16d of the vortex generator 16 to be long, and the fluid viscous force can be lowered.

Further, with the present embodiment, owing to the aforementioned configuration (2), it becomes possible to change the radius of curvature R without reliance on the aspect ratio of the flow passage 14, and even if the aspect ratio approaches 1, a shape is not formed that approximates an elliptical shape or a rectangular shape as viewed in cross section. Furthermore, because the wall portions 14c, 14d are constituted as straight line sections, the distance Xc, Xd is constant. As a result, changes in the fluid viscous force along the axial direction of the vortex generator 16 can be minimized. Consequently, with configuration (2) as well, a rise in the fluid viscous force can be suppressed.

Furthermore, with the present embodiment, owing to the aforementioned configuration (3), the long side wall portions 14a, 14b that define the flow passage 14 are curved to a degree that does not increase the influence of the fluid viscous force. Thus, even in the case that the aspect ratio approaches 1 while the distance Xc, Xd is maintained, an increase in the cross sectional area of the flow passage 14 can be suppressed. As a result, lowering of the fluid inertial force can be suppressed.

In this manner, with the flow sensor 10 according to the present embodiment, by adopting the aforementioned configurations (1) through (3), it becomes possible to suppress a rise in the fluid viscous force due to wall surface resistance in the low velocity region, and even in the case of minute flow rates close to zero, the Reynolds number Re can be enhanced. Further, by making the aspect ratio be close to 1, turbulence of the fluid in the high flow velocity (large flow rate) region can be suppressed.

Consequently, with the present embodiment, linearity of frequencies at which Karman vortexes 20 are generated with respect to volumetric flow rate in the high flow rate region can be stabilized, together with enabling detection of minute flow rates close to zero.

Further, with the present embodiment, because the vortex generator 16 and the sensor element 18 are disposed roughly centrally between the wall portions 14c, 14d, the distance Xc, Xd can be made longer, and the fluid viscous force can easily be reduced.

Moreover, because the radius of curvature R is set to a range from 15 [mm] to 40 [mm], a high flow velocity distribution is brought about in the vicinity of the sides 16c, 16d of the vortex generator 16, and the sensor element 18 can easily detect minute flow rates close to zero.

Furthermore, because the relationships Xc/W>0.9 and Xd/W>0.9 between the distances Xc, Xd and the width W of the vortex generator 16 are satisfied, a decrease in alternating vortex forces of the Karman vortex 20 and/or lowering of the strength (structural integrity) of the vortex generator 16 can be avoided.

The flow sensor according to the present invention is not limited to the aforementioned embodiment, and it is a matter of course that various additional or modified structures may be adopted therein without deviating from the essential gist of the present invention.

What is claimed is:

1. A flow sensor having a flow passage through which a fluid flows, a columnar vortex generator disposed transversely to a flow direction of the fluid in the interior of the flow passage, and a sensor element disposed in the interior of the flow passage further downstream in the flow direction than the vortex generator, such that, in an event that Karman vortexes are generated by the vortex generator upon flow of the fluid, the sensor element is capable of detecting a flow rate of the fluid based on a generated frequency of the Karman vortexes, wherein:
   a cross section of the flow passage perpendicular to the flow direction is defined by a first wall portion and a second wall portion, which face respective opposite ends of the vortex generator in an axial direction of the vortex generator, and a third wall portion and a fourth wall portion, which face respective opposite sides of the vortex generator in a widthwise direction perpendicular to the axial direction, and which connect the first wall portion and the second wall portion;
   a first dimension between the third wall portion and the fourth wall portion is longer than a second dimension between the first wall portion and the second wall portion;
   the third wall portion and the fourth wall portion are formed in substantially straight lines along the vortex generator; and
   the first wall portion and the second wall portion are curved at a predetermined radius of curvature.

2. The flow sensor according to claim 1, wherein the vortex generator and the sensor element are disposed at substantially central positions between the third wall portion and the fourth wall portion.

3. The flow sensor according to claim 1, wherein the radius of curvature is set between 15 [mm] and 40 [mm].

4. The flow sensor according to claim 1, wherein the following relationships are satisfied:

$Xc/W > 0.9$ and $Xd/W > 0.9$ where Xc is a distance between the third wall portion and the side of the vortex generator facing the third wall portion, Xd is a distance between the fourth wall portion and the side of the vortex generator facing the fourth wall portion, and W is a width of the vortex generator.

* * * * *